H. W. BUNDY.
STEERING WHEEL.
APPLICATION FILED DEC. 26, 1919.

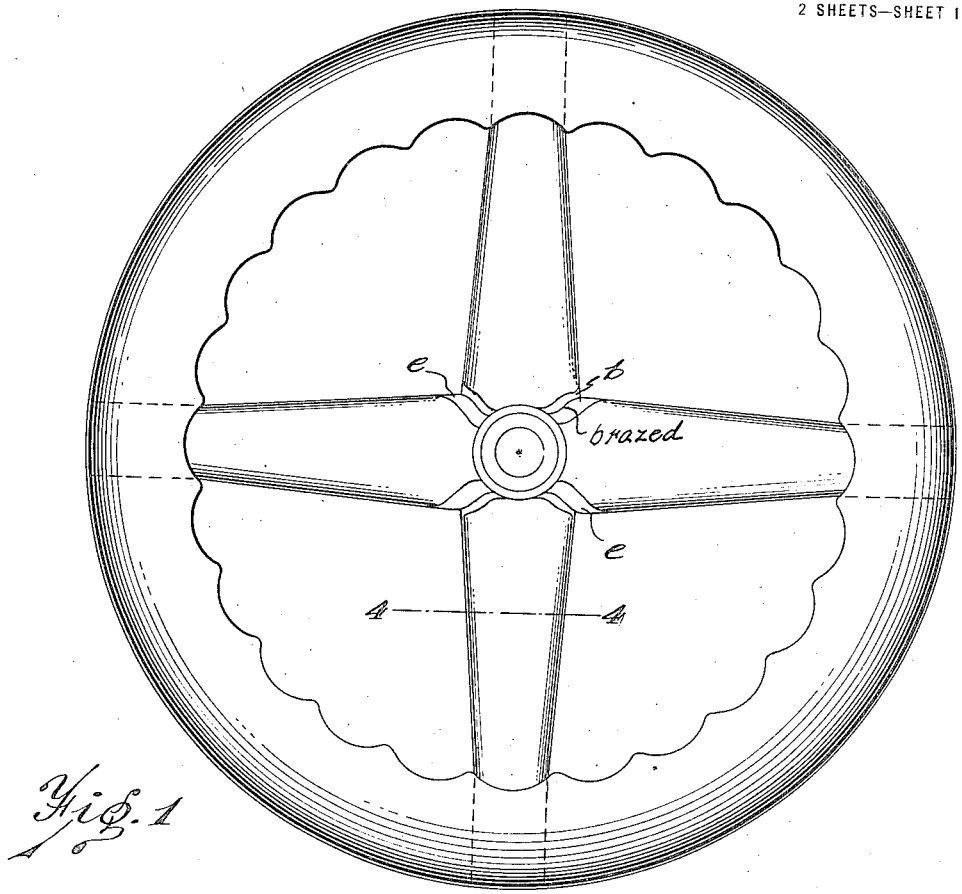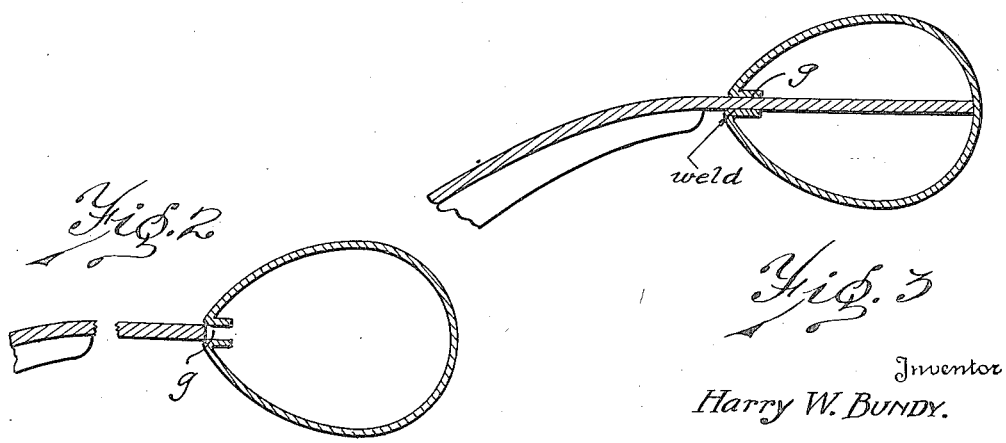

1,396,990.

Patented Nov. 15, 1921.
2 SHEETS—SHEET 2.

Inventor
HARRY W. BUNDY

By Stuart L Barnes
Attorney

UNITED STATES PATENT OFFICE.

HARRY W. BUNDY, OF DETROIT, MICHIGAN.

STEERING-WHEEL.

1,396,990. Specification of Letters Patent. Patented Nov. 15, 1921.

Application filed December 26, 1919. Serial No. 347,264.

*To all whom it may concern:*

Be it known that I, HARRY W. BUNDY, a citizen of the United States, residing at Detroit, in the county of Wayne and State of Michigan, have invented certain new and useful Improvements in Steering-Wheels, of which the following is a specification.

This invention relates to steering wheels and has for its object a new form of steering wheel which is manufactured by a new method. Steering wheels are usually made with malleable iron spiders and laminated wood rims. This is a rather expensive construction and suitable wood is not always to be had at the times it is needed. It is the object of the present invention to construct a steering wheel, the supporting parts of which are entirely made out of metal of a character that can be produced economically and expeditiously. The spider is a stamping and the rim is made out of metal produced in lengths or as stampings. The detailed construction will appear hereinafter.

In the drawings,—

Figure 1 is a plan view of the finished steering wheel.

Fig. 2 is an enlarged cross-sectional detail showing the end of the spider arm about to enter the rim.

Fig. 3 is a similar view of the same parts after the spider arm end has been fastened to the rim.

Figure 4:
Fig. 4 is a cross-section on the line 4—4 of Fig. 1.

The spider is made of two pairs of spider arms, each pair made of a single strip stamped into channel shape, as shown in Fig. 4, with the upper pair of spider arms punched out at the center to form a boss $a$ and the lower pair of spider arms flattened out at the center as at $b$ and punched to form a depending boss $c$. These two bosses and openings support the center hub $d$ which is bored and slotted after assembly for the purpose of insuring the hole being absolutely centered with the rim. This center hub is held in place by brazing or otherwise and the two center portions of the two pairs of spider arms are brazed together where the flanges $e$ of the top pair overlap the flat portion $b$ of the lower pair of spider arms.

Figure 5:
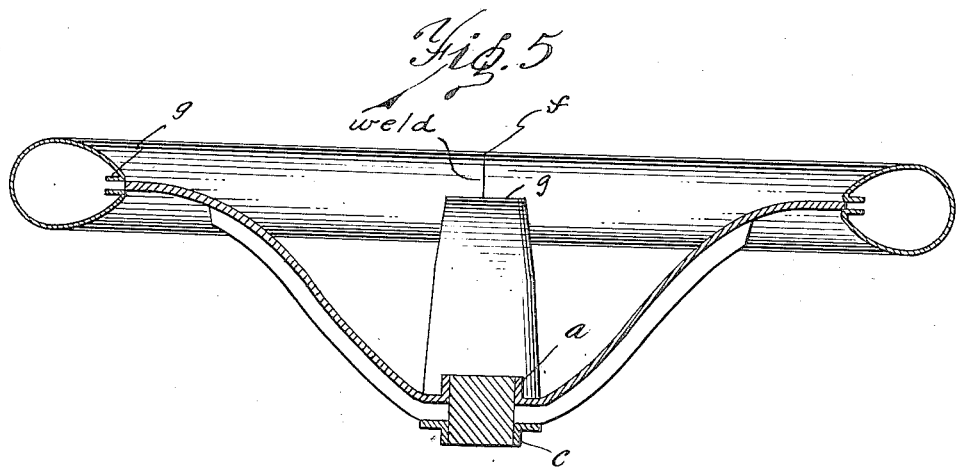
Fig. 5 is a cross-section of the spider and the rim about to be assembled.
Figure 6:
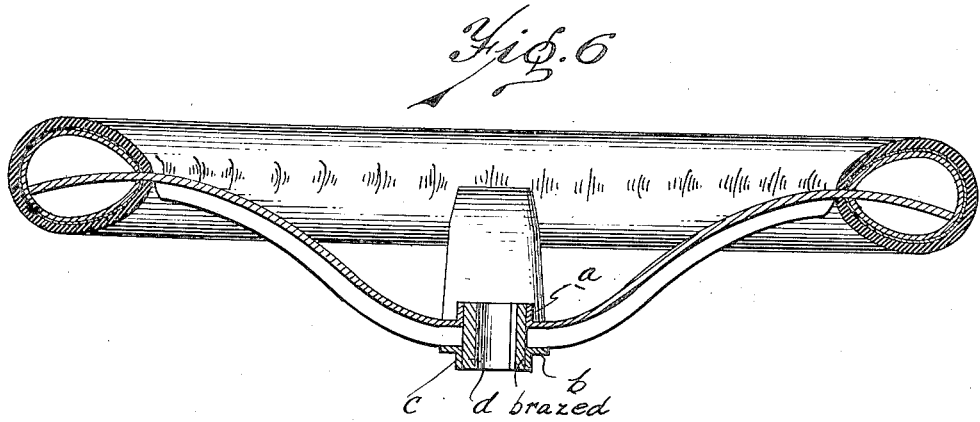
Fig. 6 is a cross-section of the spider and rim assembled with the rubber coating in place.

For the rim a piece of closed tubing is preferably used. It may be either seamless tubing, welded tubing or brazed tubing. This is bent to substantially circular shape either when it is manufactured or else by suitable bending dies and the two ends are welded together as at $f$ (Fig. 5). Slots $g$ with in-turned lips are punched on the inside of the rim for receiving the spider arms. It will be noticed (in Fig. 5) that the spider arms before they are assembled into the closed tubing are very much more concave than in the final product. This makes a very much smaller diameter for the spider arms and enables them to be placed within the interior diameter of the prospective rim. In this position they may be properly caused to register with the openings $g$ punched in the prospective rim and suitable dies may then be utilized to flatten out the spider as shown in Fig. 6, thereby spreading the spider arms and forcing them into the rim tubing, as shown in Figs. 6 and 3. The spider arm ends may then be welded to the rim, the turned-in lips formed by the punched holes forming suitable stock for this purpose. This forms a steering wheel which in itself is complete and could be used upon ordinary jobs.

However, if a more finished steering wheel is desired such as would be more suitable for high-priced passenger cars, the metal rim may be electro-plated or otherwise coated with a suitable metal or alloy that permits rubber to be vulcanized directly to the metal. It is a well known fact that with a suitable coating, the rubber can be vulcanized directly to the metal to form a chemical combination between the rubber and the metal so as to insure its very securely adhering to the metal. Patents Nos. 1,120,794, 1,057,333, and 264,121, describe processes to accomplish this and there are many others. This will form a very superior steering wheel with a rim which will not slip in the hands, which will be warm in the winter, and which may be made soft for gripping. This rubber may be fluted or otherwise corrugated as shown in Fig. 1, this being more or less a matter of taste.

The hub piece may be inserted as a solid piece, as shown in Fig. 5, and then may be drilled and slotted after assembly to assure correct centering.

What I claim is:

A steering wheel comprising a rim and a spider, the latter made up of a plurality of channeled arms extending from side to side of the rim overlapped and bossed at the center with each provided with side extending flanges at the center which are overlapped and secured together, and a hub secured in the bosses of the overlapping arms.

In testimony whereof I affix my signature.

HARRY W. BUNDY.